United States Patent [19]

Hara et al.

[11] Patent Number: 4,907,858
[45] Date of Patent: Mar. 13, 1990

[54] OPTICAL PICKUP APPARATUS

[75] Inventors: Hiroshi Hara; Hiraku Sonobe; Makoto Shihou, all of Yokohama; Osamu Koyama, Hachioji; Masamichi Tateoka, Yokohama; Koichi Ida, Tokyo; Hideaki Yano, Kokubunji, all of Japan

[73] Assignee: Canon Kabushiki Kaisha, Tokyo, Japan

[21] Appl. No.: 185,372

[22] Filed: Apr. 21, 1988

Related U.S. Application Data

[63] Continuation of Ser. No. 761,501, Aug. 1, 1985, abandoned.

[30] Foreign Application Priority Data

Nov. 16, 1984 [JP] Japan .................................. 59-242051

[51] Int. Cl.$^4$ ........................... G02B 5/04; G02B 27/14
[52] U.S. Cl. ..................................... 350/286; 350/277; 350/173
[58] Field of Search ......... 350/170, 173, 276, 276 SL, 350/277, 286, 394, 395

[56] References Cited

U.S. PATENT DOCUMENTS

| | | | |
|---|---|---|---|
| 2,178,245 | 10/1939 | Schwarz | 350/286 |
| 3,829,622 | 8/1974 | Elliot . | |
| 3,844,638 | 10/1974 | Lingenfelder et al. | 350/173 |
| 4,125,860 | 11/1978 | Ishii et al. | 350/173 |
| 4,236,821 | 12/1980 | Meyer-Arendt | 350/276 R |
| 4,333,173 | 6/1982 | Yonezawa et al. | 350/286 |
| 4,561,032 | 12/1985 | Matsumoto et al. | 360/114 |
| 4,623,225 | 11/1986 | Forkner | 350/286 |

FOREIGN PATENT DOCUMENTS 2725107 12/1978 Fed. Rep. of Germany ... 350/276 R
57-200958 12/1982 Japan .

OTHER PUBLICATIONS

Price, E. E., "Collimated Light Beam Expander-Compressor", Xerox Disc. Bull., Sep./Oct. 1981, pp. 253–254.

Primary Examiner—Bruce Y. Arnold
Assistant Examiner—J. Ryan
Attorney, Agent, or Firm—Fitzpatrick, Cella, Harper & Scinto

[57] ABSTRACT

In an optical pickup apparatus comprising a light source for applying a light beam to an optical memory medium, a beam splitter disposed in the optical path from the light source to the medium to separate the reflected beam from the medium from the beam from the light source, and a photodetector for detecting the separated reflected beam, having a surface opposed to that surface of the beam splitter which faces the photodetector is formed so as to form an angle different from the perpendicular with respect to the optic axis of the separated reflected beam.

7 Claims, 5 Drawing Sheets

OPTICAL PICKUP APPARATUS

This application is a continuation of application Ser. No. 761,501 filed Aug. 1, 1985, abandoned.

BACKGROUND OF THE INVENTION

1. Field of the Invention

This invention relates to an optical pickup apparatus for applying a light beam from a light source such as a semiconductor laser to an optical memory medium and effecting one or both of recording and reproduction of information.

2. Description of the Prior Art

In recent years, studies of optical information processing apparatuses utilizing a laser or the like to optically record or reproduce information have been actively carried out. For example, apparatuses using a medium exclusively for use for reproduction represented by a video disc or the like have already been manufactured, and further, apparatuses using a DRAW (direct read after write) medium capable of additional recording or an erasable opto-magnetic recording medium are regarded as being promising. The photo-magnetic recording medium utilizes the localized temperature rise of a magnetic thin film caused by the spot application of a laser light thereto, whereby information is magnetically recorded and is reproduced by the magneto-optic effect (especially the Kerr effect). The Kerr effect refers to the phenomenon that the plane of polarization rotates when light is reflected by a magnetic material.

Figure 1:
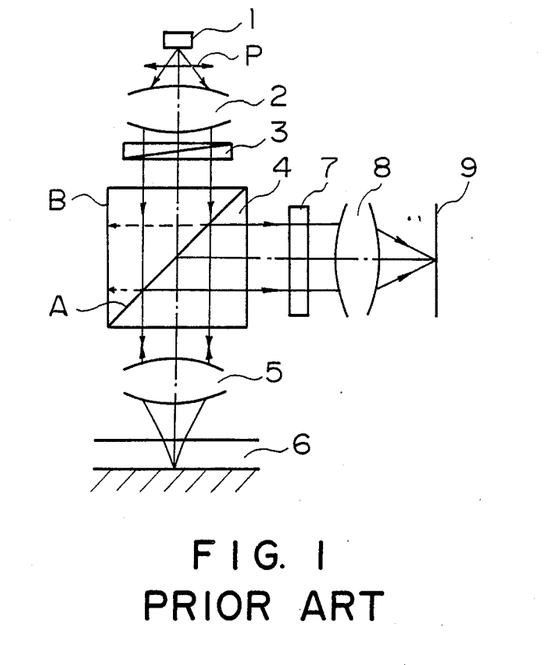
FIG. 1 is a schematic view showing the construction of an optical pickup apparatus according to the prior art.

In the optical information processing apparatus as described above, a light beam is applied to a medium through an optical pickup apparatus. FIG. 1 of the accompanying drawings is a schematic view illustrating the construction of such a conventional optical pickup apparatus. In FIG. 1, reference numeral 1 designates a semiconductor laser, reference numeral 2 denotes a collimator lens, reference numeral 3 designates a polarizer, reference numeral 4 denotes a polarizing beam splitter, reference numeral 5 designates an objective lens, reference numeral 6 denotes an opto-magnetic disc, reference numeral 7 designates an analyser, reference numeral 8 denotes a condensing lens, and reference numeral 9 designates a detector surface.

A light beam emitted from the semiconductor laser 1 is collimated by the collimator lens 2 and is made into linearly polarized light by the polarizer 3. In FIG. 1, the plane of P-polarization is parallel to the plane of the drawing sheet, the plane of S-polarization is perpendicular to the plane of the drawing sheet, and the plane of polarization of the semiconductor laser 1 is parallel (the direction of P-polarization) to the plane of the drawing sheet. If the amplitude transmittance of the P-polarized light component through the polarizing beam splitter 4 is $t_P$ and the amplitude reflectance of the S-polarized light component is $r_S$, it is known that in the optical system of FIG. 1, a signal of good S/N ratio is obtained if $r_S$ is chosen to have a great value and $t_P$ is chosen to have a suitable value (for example, $t_P^2 = 70\%$, $r_S^2 = 98\%$). (See Japanese Laid-Open Patent Application No. 200958/1982.) The parallel light beam transmitted through the polarizing beam splitter 4 is imaged as a minute spot on the opto-magnetic disc 6 by the objective lens 5.

The reflected light from the opto-magnetic disc 6 is subjected to the rotation of the plane of polarization (Kerr rotation) in opposite directions in accordance with the direction of magnetization of the area to which the spot is applied, due to the Kerr effect, and is again made into a parallel light beam by the objective lens 5. When that light beam is reflected by the polarizing beam splitter 4, the angle of polarization of the light beam (i.e., the angle through which the plane of polarization is rotated) is apparently increased by the ratio between $r_P^2$ ($=1-t_P^2$) and $r_S^2$. Thereafter, the light beam is separated into a predetermined polarized light component by the analyser 7 and passes through the condensing lens 8 to the detector surface 9 as a signal light. Thus, detection of RF signal, focus control, tracking control, etc. are effected by the use of the conventional method. Also, recording and erasing of the information are likewise effected by this system.

Such a conventional apparatus has the following disadvantages:

(1) Stray light created by the separation surface of the beam splitter mixes with the signal light and provides noise; and (2) A circular spot is not obtained on the surface of the recording medium.

The disadvantage mentioned under item (1) above is attributable to the fact that the conventional beam splitter has a cubic shape. For example, in FIG. 1, part of the incident light beam from the semiconductor laser 1 is reflected by the surface A of the polarizing beam splitter 4, is reflected also by the surface B and returns to the surface A. With regard to the surface A, to improve the S/N ratio, as previously described, the transmittance $t_P$ and the amplitude reflectance $r_P$ of the P-polarized light component are chosen to satisfy $t_P^2 = 70\%$ and $r_P^2 = 30\%$, respectively, and therefore, most of the light beam from the surface B is transmitted through the surface A and mixes with the signal light as a stray light. Since the modulated component of the signal light is weak, the stray light imparts a considerable influence even if the reflectance on the surface B is of the order of 1%.

Figure 2:
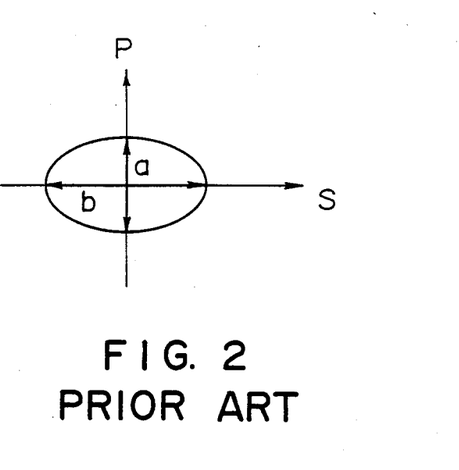
FIG. 2 shows the shape of a light beam in the optical pickup apparatus according to the prior art.

The disadvantage mentioned under item (2) above is attributable to the fact that the light distribution characteristic of the high-output semiconductor laser is, for example, of the order of 30° in a direction perpendicular to the joined surface (i.e., the beam splitting surface itself; A in FIG. 1) and of the order of 10° in a direction parallel to the joined surface. Therefore, the shape of the beam is elliptical, as shown in FIG. 2 of the accompanying drawings, and, when the beam has been condensed as a minute spot on the recording medium, a circular spot has not been obtained, thus resulting in reduced recording density.

SUMMARY OF THE INVENTION

It is an object of the present invention to provide an optical pickup apparatus which can decrease stray light and can accomplish signal detection of a high S/N ratio.

It is another object of the present invention to provide an optical pickup apparatus which can accomplish signal detection of a high S/N ratio and can also accomplish high density recording and reproduction.

The above objects of the present invention are achieved by forming, in an optical pickup apparatus comprising a light source for applying a light beam to an optical memory medium, a beam splitter disposed in the optical path from said light source to said medium to separate the reflected beam from said medium from the beam from said light source, and a photodetector for detecting said separated reflected beam, having a surface opposed to that surface of said beam splitter which faces said photodetector so as to form an angle different from the perpendicular with respect to the optic axis of said separated reflected beam.

Also, in another aspect of the present invention, the light source is a semiconductor laser, and that surface of the beam splitter on which the light beam from the semiconductor laser is incident is inclined with respect to the optical axis after the incidence and is disposed so that the light beam obliquely enters said surface at a predetermined angle with respect thereto, whereby beam shaping of the incident light beam can be accomplished.

DESCRIPTION OF THE PREFERRED EMBODIMENTS

Figure 3:
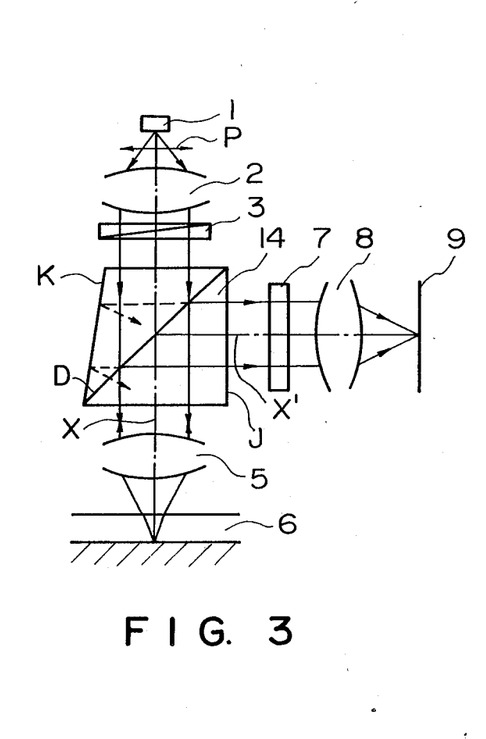
FIG. 3 is a schematic view showing a first embodiment of the present invention.

FIG. 3 is a schematic view showing a first embodiment in which the present invention is applied to an opto-magnetic disc device. In FIG. 3, members similar to those in FIG. 1 are given similar reference numerals. A light beam (P-polarized light) emitted from a semiconductor laser 1 is collimated by a collimator lens 2, passes through a polarizer 3 whose transmission axis direction is set to the direction of P-deflection, and enters a polarizing beam splitter 14. The separation surface D of the polarizing beam splitter 14 has a suitable transmittance ($t_P^2 = 70\%$) for P-polarized light, and the light transmitted therethrough is imaged as a minute spot on an opto-magnetic disc 6 by an objective lens 5.

The reflected light from the opto-magnetic disc 6 has its plane of polarization subjected to rotation in opposite directions in accordance with the direction of magnetization of the area to which the spot is applied, by the Kerr effect, and is again collimated by the objective lens 5. On the separation surface D of the polarizing beam splitter, the rotation angle of the plane of polarization is apparently increased in accordance with the ratio between the P-polarized light reflectance $r_P^2$ ($=1-t_P^2$) and the S-polarized light reflectance $r_S^2$ ($=98\%$) and the light is reflected. Thereafter, the light is separated into a predetermined polarized light component by an analyser 7, and reaches a detector surface 9 as a signal light via a condensing lens 8, whereby recording and reproduction are effected in the same manner as described in connection with FIG. 1.

The polarizing beam splitter 14 is a hexahedron formed by two triangular prisms different in vertical angle, and the surface K thereof opposed to the surface J thereof facing the detector surface 9 is formed so as to form a predetermined angle not parallel to the optical axis X of the light beam applied from the semiconductor laser 1 to the opto-magnetic disc 6, in other words, so as to form an angle different from the perpendicular to the optic axis X' of the reflected beam travelling toward the detector surface 9. Thereby, the stray light reflected from the surface K is directed to the outside of the optical path of the beam used for recording and reproduction and never enters the detector surface 9 nor returns to the semiconductor laser 1. Accordingly, the malfunctioning and the reduction in S/N ratio which would otherwise be caused by the stray light can be prevented.

Figure 4:
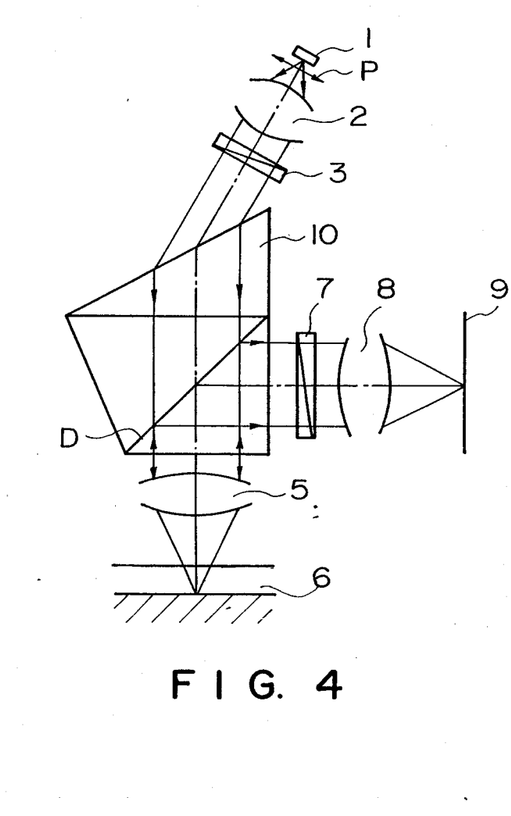
FIG. 4 is a schematic view showing a second embodiment of the present invention.

FIG. 4 is a schematic view showing a second embodiment of the present invention. In FIG. 4, members similar to those in FIG. 3 are given similar reference numerals and need not be described in detail. In the present embodiment, the other members than a polarizing beam splitter 10 perform functions similar to those of the first embodiment, and recording and reproduction of information are effected.

The polarizing beam splitter 10 in the present embodiment is such that the two sets of opposed surfaces in the optical path are formed non-parallel to each other. By such shape, this polarizing beam splitter 10 shapes the incident light caused beam from the semiconductor laser 1 and directs the stray light by the separation surface D in a direction different from the detector surface 9. This function will hereinafter be described in greater detail by reference to FIG. 5.

Figure 5:
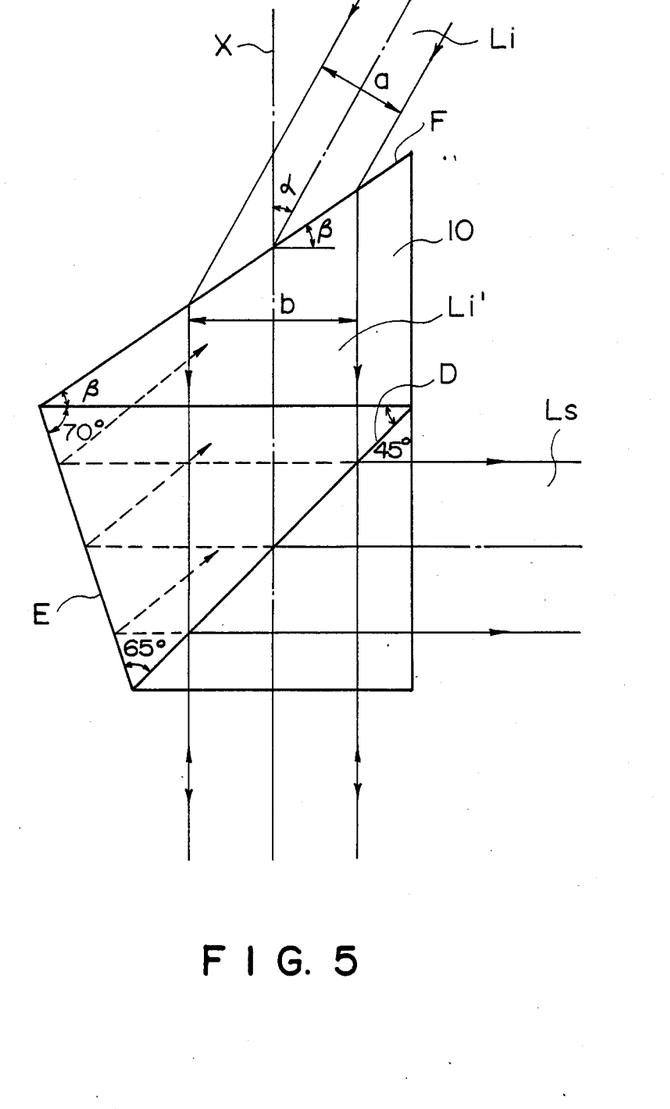
FIG. 5 is a schematic view showing the construction of a polarizing beam splitter in the apparatus shown in FIG. 4.

FIG. 5 is an enlarged view of the polarizing beam splitter 10 of the apparatus shown in FIG. 4. Since the separation surface D has the polarizing characteristic as previously described ($t_P^2=70\%$, $r_S^2=98\%$), the incident beam Li' from the semiconductor laser is reflected about 30% by the surface D and becomes stray light as indicated by broken lines. This stray light is again reflected by the surface E, but in the present embodiment, the surface E is inclined by 20° with respect to a plane perpendicular to the optic axis of a signal light $L_S$ travelling toward the detector surface and therefore, the stray light is reflected in a direction different from the detector surface and never mixes with the signal light. As previously described, in an optical pickup apparatus of this type, the signal light is weak and therefore, even a slight stray light may result in a reduced S/N ratio. The method according to the present embodiment can completely eliminate the greatest part of the stray light and therefore may be said to be an excellent method as compared, for example, with merely of providing an antireflection film on the surface E.

Another feature of the polarizing beam splitter 10 in the present embodiment is that it has the beam shaping function. In FIG. 5, the surface F on which the light beam Li from the semiconductor laser is incident is inclined by a predetermined angle $\beta$ with respect to a plane perpendicular to the optical axis X after the incidence. At the same time, the incident light beam Li also enters while being inclined by a predetermined angle $\alpha$ with respect to the optical axis X. By such construction, the present embodiment shapes the incident light beam Li into a light beam Li' of truly circular beam cross-sectional shape.

The beam cross-sectional shape of the light beam emitted from the semiconductor laser is an elliptical shape as shown in FIG. 2. When the minor diameter of this beam is a and the major diameter thereof is b, to shape it into a truly circular shape, two methods, i.e., elongating a or shortening b, would occur to mind. In the present embodiment, use has been made of the former with the direction of polarization of the semiconductor laser, the reflectance on the surface F and the shape of the polarizing beam splitter taken into account. If the refractive index of the glass material of the polarizing beam splitter is n and a/b=K to determine $\alpha$ and $\beta$, the following equation is obtained from Snell's law:

$$\sin(\alpha+\beta) = n \sin \beta \quad (1)$$

Also, the following equation is obtained from the beam shaping conditions:

$$\cos(\alpha+\beta) = K \cos \beta \quad (2)$$

From equations (1) and (2), $\alpha$ and $\beta$ are as follows:

$$\alpha = \cos^{-1}[(1 + nK)/(n + K)]$$

$$\beta = \cos^{-1}\sqrt{(n^2 - 1)/(n^2 - K^2)}$$

In the present embodiment, K=0.4971, n=1.62935 ($\lambda$=0.835 nm), $\alpha$=31.66° and $\beta$=34°. Thus, in the present embodiment, by endowing the polarizing beam splitter with the beam shaping function, a circular spot is obtained by means of a simple construction without providing any special beam shaping means.

Figure 6:
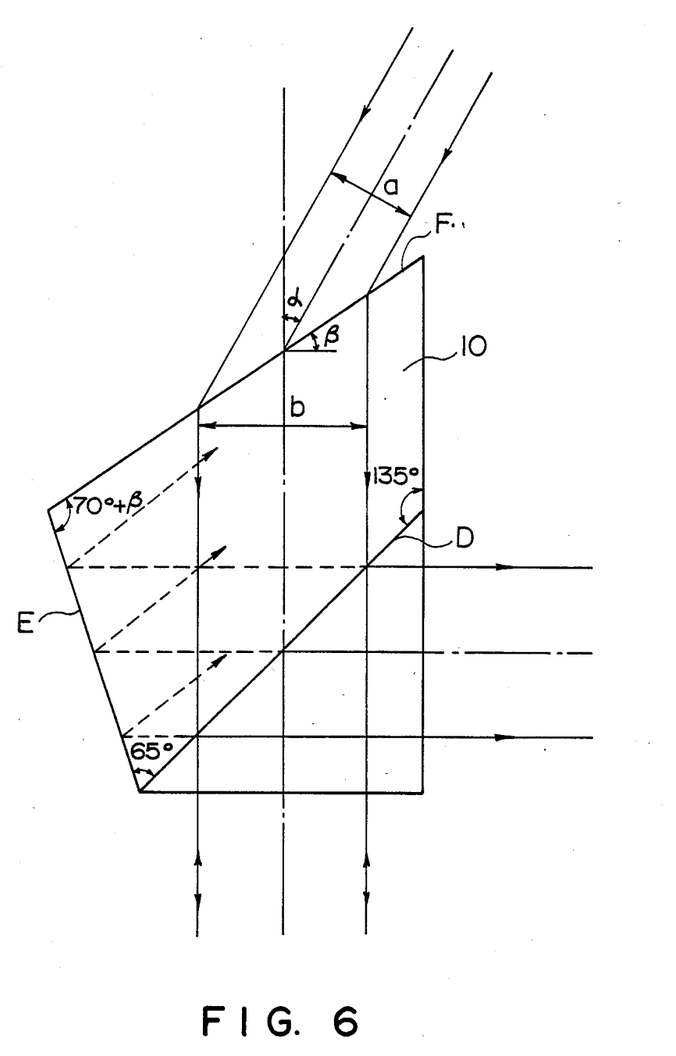
FIG. 6 is a schematic view showing another example of the construction of the polarizing beam splitter.

In the example of FIG. 5, the polarizing beam splitter 10 is comprised of three triangular prisms made separately from one another, but alternatively, it may be comprised of a combination of a triangular prism and a quadrilateral cross-section prism as shown in FIG. 6. In this case, the number of parts is decreased and further, the number of assembling steps is also decreased.

Figure 7A:
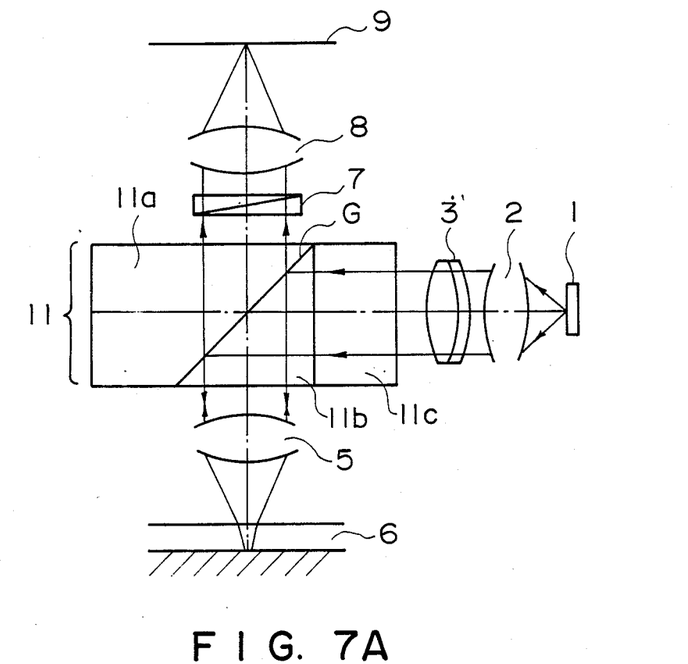
FIGS. 7A and 7B are schematic views showing a third embodiment of the present invention.
Figure 7B:
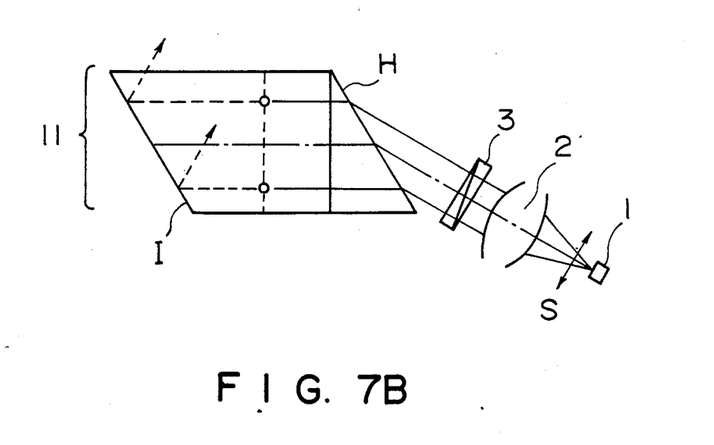

FIGS. 7A and 7B are a side cross-sectional view and a plan cross-sectional view, respectively, showing a third embodiment of the present invention. In FIGS. 7A and 7B, members similar to those in FIG. 4 are given similar reference numerals and need not be described in detail. In the present embodiment, design is made such that the incident light beam from the semiconductor laser is reflected by the separation surface G of a polarizing beam splitter 11 and directed to the opto-magnetic disc 6, and the S-polarized light reflectance of the separation surface G is chosen to have a suitable value and the P-polarized light transmittance thereof is chosen to have a great value (e.g., $r_S^2$=70%, $t_P^2$=98%).

The light beam (S-polarized light) emitted from the semiconductor laser 1 passes through the collimator lens 2 and the polarizer 3, obliquely enters the surface H of the polarizing beam splitter 11 and is beam-shaped as in the embodiment of FIG. 4. This incident light beam is reflected 70% by the aforementioned separation surface G and is condensed on the opto-magnetic disc 6 by the objective lens 5. The reflected light beam reflected by the opto-magnetic disc 6 and having created a P-polarized light component by the Kerr effect passes through the objective lens 5 and again enters the polarizing beam splitter 11. The rotation angle of the plane of polarization of the light beam is apparently increased by the polarizing characteristic of the aforementioned separation surface G and the light beam is transmitted through the polarizing beam splitter 11, and passes through the analyser 7 and the condensing lens 8 and is detected by the detector surface 9. Stray light created by the incident light beam from the semiconductor laser 1 being transmitted through the separation surface G is reflected in a direction different from the detector surface 9 by the surface I inclined with respect to the optic axis and is completely separated from the signal light.

In the present embodiment, the polarizing beam splitter 11 is formed by joining three members 11a, 11b and 11c together, but the number of parts can be reduced by forming the members 11c and 11b integrally with each other.

The present invention is not restricted to the above-described embodiments, but various applications thereof are possible. For example, the aforedescribed opto-magnetic disc device is liable to cause stray light to be created from its polarizing characteristic of increasing the Kerr rotation angle and the signal component is minute and therefore, the optical pickup apparatus of the present invention is particularly effective therewith, but the present invention may also be applied to other optical information processing devices such as digital audio disc devices and video disc devices to obtain a similar effect.

We claim:

1. An optical pickup apparatus comprising:
    a light source for applying a light beam to an optical memory medium;
    a beam splitter disposed in the optical path from said light source to the medium to separate the reflected beam from the medium from the beam from said light source, said beam splitter consisting of a plurality of prisms joined together; and
    a photodetector for detecting the separated reflected beam, the surface of said beam splitter which faces said photodetector being perpendicular to the optical axis of the separated reflected beam, and the surface of said beam splitter that is opposed to said surface facing said photodetector being non-parallel with said surface of said beam splitter facing said photodetector.

2. An optical pickup apparatus according to claim 1, wherein said beam splitter is comprised of two triangular prisms different in vertical angle joined together.

3. An optical pickup apparatus according to claim 1, wherein said light source comprises a semiconductor laser, and that surface of said beam splitter on which the light beam from said semiconductor laser is incident forms an angle different from the perpendicular with respect to the optical axis of said light beam and shapes said light beam so that the cross-sectional shape of said light beam is substantially circular.

4. An optical pickup apparatus according to claim 3, wherein said beam splitter is comprised of three triangular prisms different in vertical angle joined together.

5. An optical pickup apparatus according to claim 3, wherein said beam splitter is comprised of a triangular prism and a prism of quadrilateral cross-section joined together.

6. An optical pickup apparatus according to claim 3, wherein when the angle formed between the optical axes of light beams before and after entering said beam splitter is ? and the angle formed between the surface of said beam splitter on which the light beam is incident and the surface of said beam splitter which is perpendicular to the optical axis of the light beam after incidence is $\beta$, $\alpha$ and $\beta$ satisfy the following equations:

$$\alpha = \cos^{-1}[(1 + nK)/(n + K)]$$

-continued $$\beta = \cos^{-1}\sqrt{(n^2 - 1)/(n^2 - K^2)}$$

where K=a/b, n is the refractive index of the beam splitter, a is the minor diameter of the light beam before incidence, and b is the major diameter of the light beam before incidence.

7. An optical pickup apparatus according to claim 1, wherein said optical memory medium is an opto-magnetic recording medium and said beam splitter is a polarizing beam splitter having a separation surface exhibiting different reflectances in conformity with the direction of polarization.

* * * * *

UNITED STATES PATENT AND TRADEMARK OFFICE
CERTIFICATE OF CORRECTION

PATENT NO. : 4,907,858

DATED : March 13, 1990

INVENTOR(S) : HIROSHI HARA, ET AL.

It is certified that error appears in the above-identified patent and that said Letters Patent is hereby corrected as shown below:

COLUMN 4

Line 5, "optic axis X'" should read --optical axis X'--.
Line 26, "caused" should be deleted.
Line 27, "light by" should read --light caused by--.
Line 50, "of" should be deleted.

COLUMN 6

Line 61, "?" should read --α--.

Signed and Sealed this

Ninth Day of April, 1991

Attest:

HARRY F. MANBECK. JR.

Attesting Officer     Commissioner of Patents and Trademarks